United States Patent Office 3,478,070
Patented Nov. 11, 1969

3,478,070
PROCESS FOR SELECTIVELY ACYLATING THE 3-OL GROUP IN POLYHYDROXY 13-ALKYL GONA-(AND 8 - ISOGONA) - 1,3,5 - (10) - TRIENES AND DELTA - 7 -, DELTA - 8(9), DELTA - 9(11) -, AND DELTA - 8(9),14(15) - DEHYDRO DERIVATIVES THEREOF
Reinhardt P. Stein, Conshohocken, and Herchel Smith, Wayne, Pa., assignors to American Home Products Corporation, New York, N.Y., a corporation of Delaware
No Drawing. Filed Dec. 26, 1967, Ser. No. 693,112
Int. Cl. C07c 167/28, 169/08; A61k 27/00
U.S. Cl. 260—397.5                                                   11 Claims

ABSTRACT OF THE DISCLOSURE

Polyhydroxy 13-alkylgona-(and 8-isogona)-1,3,5(10)-triene 3-ols and $\Delta^7$-, $\Delta^{8(9)}$-, $\Delta^{9(11)}$- and $\Delta^{8(9),14(15)}$- dehydro analogs thereof are selectively acylated in the 3-position by reaction with alkali metal alkoxide in a lower alkanol, displacement of the lower alkanol with a polar inert solvent and acylation in said solvent. The products of the process are hormonally active, especially estrogenically and anti-lipemically active and also are useful as intermediates in the preparation of hormonally active steroids, such as 17α-ethynylestradiol.

---

This invention is concerned with the preparation of steroid compounds useful in therapy and as intermediates for therapeutically useful compounds. More particularly, it relates to a new and useful process for the selective acylation of the phenolic hydroxyl function of A-ring aromatic, polyhydroxylated steroids. Compounds prepared by this process are estrogenically—and anti-lipemically-active and are important intermediates in the preparation of biologically active steroids.

BACKGROUND OF THE INVENTION

Those skilled in the art of steroid chemistry often require means to protect a reaction-labile group before transformation of another remote functional group, and then a means to regenerate the protected group. For example, in the preparation of biologically-active 3-hydroxy steroids with transformed C–17 functions from readily available 3,17-dihydroxy starting materials, it would be of substantial benefit to be able selectively to protect the 3-hydroxy group in such a way that the protective group can later be removed. Such a means would permit, for example, the preparation of 17α-ethynylestradiol, a compound widely used in anovulatory compositions, from estradiol (instead of from estrone, as now is done) by formation of a 3-acyloxyestradiol, oxidation of the 17-hydroxymethylene group to 17-keto, transformation of 17-keto to 17α-ethynyl-17β-hydroxy, and removal of the protective 3-acylate so as to regenerate a 3-phenolic hydroxl group. However, those skilled in the art would view such a proposal with some pessimism since any acylating agent capable of reacting with the 3-ol group is just as likely to react with other hydroxyl groups, especially with 17β-ol groups. It has now surprisingly been found that with careful selection of reaction conditions and by making a judicious choice of solvents such a selective 3-acylation of polyhydroxy steroids can readily be accomplished.

It is, accordingly, a primary object of this invention to provide a means selectively to acylate the 3-ol group in polyhydroxylated, A-ring aromatic steroids.

It is a further object to provide a selective means to protect the 3-hydroxyl group in a polyhydroxylated, A-ring aromatic steroid, to transform other functional groups in the steroid, and then to regenerate the 3-hydroxyl group.

It is another object of the instant invention to provide an improved means to obtain selectively 3-acylated, polyhydroxylated, A-ring aromatic steroids useful for their estrongenic and anti-lipemic properties.

DESCRIPTION OF THE INVENTION

These and other objects of this invention are readily obtained by practice of the instant invention which is, in essence: a process for the preparation of a 3-(lower) acyloxy-13-alkylgona- (and 8-isogona) 1,3,5(10-trien-17β-ol of Formula I

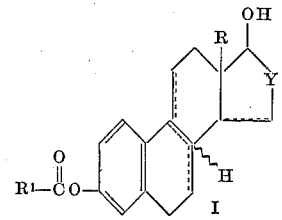

and the $\Delta^7$-, the $\Delta^{8(9)}$-, the $\Delta^{9(11)}$- and the $\Delta^{8(9),14(15)}$- dehydro analogs thereof, wherein R and R¹ are lower alkyl, Y is methylene or hydroxymethylene, the symbol ($\xi$) indicates α- or β-configuration, and the broken lines indicate unsaturation in said analogs, which comprises selectively acylating the 3-hydroxy group of a corresponding polyhydroxylated steroid compound of Formula II:

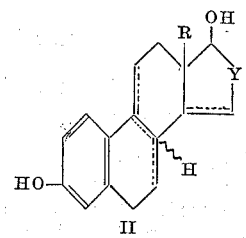

wherein R and Y are as hereinabove defined by:
 (a) reacting said polyhydroxylated steroid with at least about one equivalent of an alkali metal (lower)alkoxide in a lower alkanol medium until conversion of the 3-hydroxyl group to the corresponding anionic form is substantially complete;
 (b) displacing said lower alkanol medium with a polar inert solvent medium,
 (c) reacting the mixture of Step (b) with at least about one equivalent of a (lower)acyl anhydride or (lower) acyl halide until conversion of the anionic form of the 3-hydroxyl group to a (lower)acyloxy group is substantially complete; and
 (d) recovering the product of Step (c).

Special mention is made of a number of important embodiments of the instant invention.

These are respectively:

A process as next above defined wherein, in Step (a), said alkali metal alkoxide is sodium methoxide and said lower alkanol medium is methanol.

A process as first above defined wherein, in Step (b) said polar inert solvent medium is ethylene glycol dimethyl ether.

A process as first above defined wherein Step (c) is carried out at a temperature of from about 25° C. to about 100° C. for from about 15 minutes to about three hours.

A process as first above defined wherein 13-methylgona-1,3,5(10)8-tetraene-3,17β-diol, 3-acetate is prepared by
 (a) reacting 13-methylgona-1,3,5(10),8-tetraene-3,17β-diol with sodium methoxide in methanol;
 (b) removing the methanol by vacuum distillation and adding ethylene glycol dimethyl ether;
 (c) reacting the mixture of Step (b) with acetic anhydride; and
 (d) recovering the product by removing the solvent by distillation in a vacuum.

A process as first above defined wherein 13-ethylgona-1,3,5(10),8-tetraene-3,17β-diol, 3 acetate is prepared by
 (a) reacting 13 - ethylgona-1,3,5(10),8-tetraene-3,17β-diol with sodium methoxide in methanol;
 (b) removing the methanol by vacuum distillation and adding ethylene glycol dimethyl ether;
 (c) reacting the mixture of Step (b) with acetic anhydride; and
 (d) recovering the product by removing the solvent by distillation in a vacuum.

A process as first above defined wherein d-13-methylgona-1,3,5(10)-triene-3,17β-diol, 3-acetate is prepared by
 (a) reacting d - 13-methylgona-1,3,5(10)-triene-3,17β-diol with sodium methoxide in methanol;
 (b) removing the methanol by vacuum distillation and adding ethylene glycol dimethyl ether;
 (c) reacting the mixture of Step (b) with acetic anhydride; and
 (d) recovering the product by removing the solvent by distillation in a vacuum.

A process as first above defined wherein 13-methylgona-1,3,5(10),7-tetraene-3,17β-diol, 3-acetate is prepared by
 (a) reacting 13-methylgona-1,3,5(10),7-tetraene-3,17β-diol with sodium methoxide in methanol;
 (b) removing the methanol by vacuum distillation and adding ethylene glycol dimethyl ether;
 (c) reacting the mixture of Step (b) with acetic anhydride; and
 (d) recovering the product by removing the solvent by distillation in a vacuum.

A process as first above defined wherein 13-ethylgona-1,3,5(10),9(11)-tetraene-3,17β-diol, 3-acetate is prepared by
 (a) reacting 13 - ethylgona-1,3,5(10),9(11)-tetraene-3,17β-diol with sodium methoxide in methanol;
 (b) removing the methanol by vacuum distillation and adding ethylene glycol dimethyl ether;
 (c) reacting the mixture of Step (b) with acetic anhydride; and
 (d) recovering the product by removing the solvent by distillation in a vacuum.

A process as first above defined wherein 13-ethylgona-1,3,5(10),8,14-pentaene-3,17β-diol, 3-acetate is prepared by
 (a) reacting 13 - ethylgona-1,3,5(10),8,14-pentaene-3,17β-diol with sodium methoxide in methanol;
 (b) removing the methanol by vacuum distillation and adding ethylene glycol dimethyl ether;
 (c) reacting the mixture of Step (b) with acetic anhydride; and
 (d) recovering the product by removing the solvent by distillation in a vacuum.

A process as first above defined wherein 13-ethylgona-1,3,5(10)-triene-3,16α,17β-triol, 3-acetate is prepared by
 (a) reacting 13 - ethylgona-1,3,5(10)-triene-3,16α,17β-triol with sodium methoxide in methanol;
 (b) removing the methanol by vacuum distillation and adding ethylene glycol dimethyl ether;
 (c) reacting the mixture of Step (b) with acetic anhydride; and
 (d) recovering the product by removing the solvent by distillation in a vacuum.

In the specification and in the appended claims the term "(lower)alkyl" contemplates saturated hydrocarbon radicals, straight and branched chain, having from about 1 to about 6 carbon atoms and includes, for example, methyl, ethyl, n-propyl, i-propyl, n-butyl, t-butyl, n-pentyl, n-hexyl, 3-methyl pentyl, and the like. The term "(lower)acyl" contemplates alkanoyl groups, both straight chain or branched, or from about 1 to about 6 carbon atoms and includes, for example, formyl acetyl, n-propionyl, n-butyroyl, i-butyroyl, n-pentanoyl, n-hexanoyl, 3-methylpentanoyl, and the like. The term "(lower)alkanol" contemplates aliphatic alcohols, straight and branched chain, containing from about 1 to about 6 carbon atoms and includes, for example, methanol, ethanol, n-propanol, i-propanol, n-butanol, t-butanol, n-pentanol, n-hexanol, 3-methylpentanol, and the like. The term "alkali metal (lower)alkoxide" contemplates organometallic derivatives of lithium, potassium, sodium, cesium and rubidium and (lower) alkanols and includes, for example, sodium methoxide, potassium methoxide, lithium methoxide, cesium methoxide, rubidium methoxide, sodium ethoxide, sodium n-propoxide, sodium i-propoxide, sodium n-butoxide, sodium t-butoxide, potassium t-butoxide, sodium n-pentoxide, sodium n-hexoxide and the like. The term "(lower)acyl anhydride" contemplates compounds containing (lower)alkanoyl groups as above defined and includes, for example, acetic anhydride, n-propionic anhydride, n-butyric anhydride, i-butyric anhydride, n-pentanoic anhydride, n-hexanoic anhydride and the like. The term "(lower)acyl halide" contemplates lower(acyl) halogenides derived from fluorine, chlorine, bromine and iodine, the (lower)acyl group being as above illustrated, and includes, for example, acetyl fluoride, acetyl chloride, acetyl bromide, acetyl iodide, n-propionyl chloride, n-butyroyl chloride, i-butyroyl chloride, n-pentanoyl chloride, n-hexanoyl chloride, 3-methylpentanoyl chloride, and the like. The term "polar inert solvent medium" contemplates solvents, organic and inorganics, which are polar in nature and are not susceptible to reaction with (lower)acyl anhydrides or (lower)acyl halides under the conditions exemplified and includes, for example, ethylene glycol dimethyl ether, dioxane, dimethylformamide, dimethylacetamide, and the like.

Starting materials of Formula II herein are commercially available or can readily be prepared by techniques familiar to those skilled in the art. For example, d-estradiol, a compound of Formula II wherein R is methyl is an item of commerce.

The 13-alkylgona - 1,3,5(10) - triene - 3,17β - diols of Formula II are prepared by means exemplified by Gordon Alan Hughes and Herchel Smith in copending U.S. patent application No. 534,353 filed Mar. 15, 1966.

The 13 - alkyl - 8 - isogona - 1,3,5(10) - triene - 3,17β-diols of Formula II are prepared by means exemplified by Gordon Alan Hughes and Herchel Smith in copending U.S. patent application Ser. No. 461,909, filed June 7, 1965, now U.S. 3,407,217.

The 13 - alkylgona - 1,3,5(10),7 - tetraene - 3,17β-diols of Formula II are prepared by means exemplified by R. P. Stein, G. C. Buzby, Jr., and Herchel Smith in copending U.S. patent application Ser. No. 559,175, filed June 21, 1966, now abondoned.

The 13 - alkylgona - 1,3,5(10),8(9)tetraene - 3,17β-diols of Formula II are prepared by means exemplified by Gordon Alan Hughes and Herchel Smith in copending U.S. patent application Ser. No. 467,419, filed June 28, 1965, now U.S. 3,391,169.

The 13 - alkylgona - 1,3,5(10),9(11)tetraene - 3,17β-diols of Formula II are prepared by means exemplified by Gordon Alan Hughes and Herchel Smith in copending U.S. patent application Ser. No. 488,936, filed Sept. 21, 1965, now U.S. 3,391,170.

The 13 - alkylgona - 1,3,5(10),8(9),14(15)pentaene-3,17β-diols of Formula II are prepared by means exemplified by Gordon Alan Hughes and Herchel Smith in U.S. 3,202,686.

In carrying out Step (a) of the instant process, the steroid of Formula II may be added to a mixture of the alkali metal (lower)alkoxide and the (lower)alkanol at any convenient temperature, e.g. from about 10° C. to about 50° C., or even higher. It is preferred to use at least about one equivalent amount of the alkali metal (lower)alkoxide, or a slight excess, e.g., up to about a 10% excess, based on the steroid starting material. The reaction forming the anion salt, especially at about 25° C., is quite rapid and is substantially complete almost instantaneously.

In carrying out Step (b), displacement of the (lower) alkanol by the polar inert solvent, resort can be made to adding the solvent and fractionally distilling off the (lower)alkanol. However, especially in cases where the respective boiling points are close, it is preferred and convenient first to distill off the (lower)alkanol, then to resuspend the residue in the desired volume of inert polar solvent.

In carrying out Step (c), reaction of the product of Step (b) with the acylating agent, which may be a (lower)acyl anhydride, (lower)acyl halide, or obvious chemical equivalent thereof, such as, for example a (lower)acyl p-toluenesulfonate, the acylating agent can be added to the mixture at temperatures of from about 10° C. to about 150° C., but preferably at from about 25° C. to about 100° C. It is preferred to use at least about one equivalent amount of the acylating agent, or a slight excess, e.g., up to about a 10% excess, based on the steroid. The reaction forming the desired selectively acylated product is substantially complete, depending on the temperature, in from about 15 minutes to several, e.g., about 3, hours.

After selective acylation is complete, recovery of the product of Formula I according to Step (d) is accomplished by conventional methods. For example, sometimes the product can be induced to precipitate by cooling the mixture, especially if it first has been concentrated, then the precipitate is recovered by filtration. One especially useful means is to distill off all of the reaction solvent, leaving the product as a residue. To proceed in this manner, the solvent is distilled off in a vacuum. Any excess acylating agent can be decomposed by adding 5% ammonium chloride solution. The mixture then can be extracted with a water immiscible organic solvent, such as ethyl acetate, and the extract can be washed with water, saturated sodium chloride solution and dried over anhydrous sodium sulfate. Evaporation of the solvent leaves the product of Formula I as a residue. If desired, it may be further purified by chromatography: it is dissolved in chloroform and passed through a column of active silica gel. The eluates can be combined and evaporated. The residue can often be induced to crystallize by trituration with ether or isopropanol and can be recrystallized from a (lower)alkanol.

The time and temperature ranges used in describing the aforementioned process steps simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time, although purity of the product may be somewhat decreased.

The sources for the starting materials of Formula II have been specified hereinabove. Generally, all can be prepared by totally synthetic processes described by Douglas, Graves, Hartley, Hughes, McLoughlin, Siddall and Smith in J. Chem. Soc., 1963 pages 5077–94. In the product of a total synthesis which has not included a suitable resolution stage the compounds prepared by the invention will be present as racemates. Using a convention approved by Fieser and Fieser, "Steroids," p. 336 (1959), the compounds designated as the d-forms are the enantiomers corresponding in configuration at C-13 to that of the natural hormone estrone. The corresponding enantiomorphs are consequently designated the l-forms and the racemates the dl-forms. Racemates will be depicted by structural formulas which show only the enantiomorphs of the d-configuration.

As is mentioned hereinabove, the compounds of Formula I prepared by this process have estrogenic and antilipemic activity. This makes them useful to treat conditions in mammals responsive to treatment with estogenic drugs, such as, for example, menopause, senile vaginitis, kraurosis vulvae, pruritis vulvae and the like. In addition they are useful to lower blood lipid level of mammals and can be used whenever anti-lipemic agents are indicated, such as in the treatment of various hyperlipid aemias or where the incidence of atherosclerosis is to be minimized. The products prepared by the instant process are also useful as intermediates for the preparation of other steroids, such as 17α-ethynylestradiol as mentioned above which have hormonal or other useful activities.

The products of Formula I prepared by this invention can be used in association with a pharmaceutically acceptable carrier. They can be formulated in liquid or solid forms, for instance as capsules, tablets, suppositories, powders, dispersible granules, cachets, and the like, by combining them with conventional carriers. Such conventional carriers include magnesium carbonate or stearate, talc, sugar, lactose, pectin, dextrin, starch, gelatin, tragacanth, methyl cellulose, sodium carboxymethyl cellulose, low melting wax and cocoa butter. Diluents, flavoring agents, solubilizers, lubricants, suspending agents, binders or tablet-disintegrating agents can be used. Powders or tablets preferably contain 5 or 10 to 99% of the active constituent. The active steroid can be formulated with an encapsulating material with or without other carriers.

Liquid preparations such as solutions, suspensions or emulsions can also be used. Such preparations include dispersions in a pharmaceutically acceptable carrier such as arachis oil or sterile water, preferably containing a non-ionic surface active agent such as fatty acid esters of polyhydroxy compounds, e.g., sorbitan, aqueous starch in sodium carboxymethylcellulose solutions, aqueous propylene glycol or polyethylene glycol. Thus a water-propylene glycol solution can be used for parenteral injection and aqueous suspensions suitable for oral use can be made by utilizing natural or synthetic gums, resins, methyl cellulose or other well known suspending agents.

The composition can be in unit dose form in which the dose unit is for instance from about 0.1 to about 200 mg. of each active steroid. The unit dose form can be a packaged composition, e.g., packeted powder, vials or ampules or, for example, in the form of capsules, cachets or tablets or any number of these in packaged form. The pharmaceutical compositions can also consist substantially solely of the active steroid when this is in unit dose form. When used for the purposes stated above, the dosage of the compounds will vary with the condition being treated, but in general will be in the range established for estradiol (Merck Index, seventh edition, p. 416 (1960)).

d-Estradiol-3-acetate, one of the products prepared by the instant process (and which itself is the subject of U.S. 2,156,599), can be used at a level of 1.25 mg. daily, orally, in menopausal syndrome and from 1.25 to 3.75 mg. or more, daily, for senile vaginitis, kraurosis vulvae or pruritis vulvae, in warm blooded animals of about 70 kilogram average body weight, depending on the tissue response of the individual.

Of course, as will be clear to those skilled in the art, in addition to compound designated by Formula II, the process broadly can be applied to obvious chemical equivalents thereof but differing therefrom in the sense of having other functional groups attached to the steroid nucleus, whenever such groups do not themselves interfere or become affected by the process, unless, in exceptional instances, this is a desired effect. Broadly stated, therefore, useful substrates would be represented by the formula $$R^2-(OH)_n$$

wherein $n$ is at least two and $R^2$ is a cyclopentanopolyhydrophenanthrene nucleus monohydroxylated in its aromatic A-ring which, on selective acylation at the 3-position, would provide a product with anti-lipemic and estrogenic activity.

DESCRIPTION OF THE PREFERRED EMBODIMENTS

The following examples are given by way of illustration and are not to be construed as limitations of this invention, variations of which are possible without departing from the scope and spirit thereof.

Example 1 dl-13-methylgona-1,3,5(10),8 - tetraene-3,17β - diol, 3-acetate.—Add dl-13-methylgona-1,3,5(10), 8-tetraene-3,17β-diol, 2.70 g., to a solution of sodium methoxide (0.594 g.) in anhydrous methanol (40 ml.). Stir, then remove the solvent in vacuo. Add ethylene glycol dimethyl ether (100 ml.) to the residue and stir, then add a solution of acetic anhydride (1.12 g.) in ethylene glycol dimethyl ether (15 ml.). Stir the reaction for 15 min. at room temperature, heat on a steam bath for 15 min. then stir again at room temperature for 15 min. Remove the solvent in vacuo. Decompose the residue with 5% ammonium chloride solution (200 ml.). Extract the mixture with ethyl acetate and wash the extract with water and saturated sodium chloride solution then dry over anhydrous sodium sulfate. Filter and remove the solvent in vacuo. Dissolve the residue in chloroform and pass the solution through a column of active silica gel. Wash the column well with chloroform then combine the eluates and remove the solvent in vacuo. Add a small amount of ether to the residue to initiate crystallization. Cover the resulting solid with isopropanol and filter the crude title product to get 1.45 g. of near-white prisms, M.P. 143–145°. Further purify a sample by treating a methylene chloride solution with decolorizing charcoal, filtering through filter aid and replacing the methylene chloride with isopropanol by boiling on the steam bath. Allow the solution to stand to fully crystallize. Filter the resulting white prisms to get the pure title product; M.P. 146–148°;

$\lambda_{max.}^{KBr}$ 3.02 and 5.68 $\mu$; $\lambda_{max.}^{EtOH}$ 277 m$\mu$ ($\epsilon$14,800)

Calcd. for $C_{20}H_{24}O_3$ C, 76.89; H, 7.74. Found: C, 76.93; H, 7.74.

Example 2 dl - 13 - ethylgona-1,3,5(10),8-tetraene-3,17β-diol, 3-acetate.—Add dl - 13 - ethylgona-1,3,5(10),8-tetraene-3,17β-diol, 2.84 g., to a solution of sodium methoxide (0.550 g.) in anhydrous methanol (30 ml.). Stir the solution, then remove the solvent in vacuo. Add ethylene glycol dimethyl ether (100 ml.) to the residue and stir, then add acetic anhydride (1.12 g.). Stir the reaction at room temperature for 15 min., heat on a steam bath for 15 min. and stir again at room temperature for 15 min. Remove the solvent in vacuo. Decompose the residue with 5% ammonium chloride solution (100 ml.) then extract well with ethyl acetate. Wash the extract with water and saturated sodium chloride solution then dry over anhydrous sodium sulfate. Filter and remove the solvent in vacuo. Dissolve the resulting solid in chloroform and pass the solution through an active silica gel column. Elute with chloroform and evaporate the solvent in vacuo. Purify the solid residue by dissolving in methylene chloride, treating with decolorizing charcoal and filtering through super cel. Replace the methylene chloride with isopropanol by boiling on the steam bath. Seed the solution and let stand to fully crystallize. Filter the resulting white needles of title product to get 1.94 g.; M.P. 140–142°;

$\lambda_{max.}^{KBr}$ 2.87, 2.97 (hydroxyl doublet)

5.69 and 5.78 (acetoxy carbonyl doublet) $\mu$;

$\lambda_{max.}^{EtOH}$ 277 m$\mu$ ($\epsilon$ 14,200)

Calcd. for $C_{21}H_{26}O_3$: C, 77.27; H, 8.03. Found: C, 77.03; H, 7.72.

Example 3 d-13-methylgona - 1,3,5(10) - triene-3,17β-diol, 3-acetate (d-estradiol-3-acetate).—Dissolve de-estradiol (2.72 g.) in a solution containing sodium methoxide (0.594 g.) in anhydrous methanol (50 ml.). Stir, then remove the methanol in vacuo. Add ethylene glycol dimethyl ether (100 ml.) to the residue, stir then add acetic anhydride (1.12 g.). Stir the reaction at room temperature for 15 min., heat on a steam bath for 15 min. then stir again at room temperature for ½ hour. Remove the solvent in vacuo and decompose the residue with 5% ammonium chloride solution (150 ml.). Extract the mixture with ethyl acetate and wash the extract with water and saturated sodium chloride solution then dry over anhydrous sodium sulfate. Filter and evaporate the solvent in vacuo. Dissolve the residue in chloroform and pass the solution through a column of active silica gel. Evaporate the chloroform in vacuo to an oil. Cover the oil with a small amount of ether to induce crystallization. Triturate the resulting solid with isopropanol to obtain 0.77 g. of the title product; M.P. 139–141°;

$\lambda_{max.}^{KBr}$ 2.88 and 5.76 $\mu$; $[\alpha]_D^{24}$ +67° (C=1, chf.).

Example 4 d-13-methylgona-1,3,5(10),7-tetraene-3,17β-diol, 3-acetate; (d-17-dihydroequilin-3-acetate).—Dissolve d - 17-dihydroequilin (5.40 g.) in a solution containing sodium methoxide (1.188 g.) in anhydrous methanol (60 ml.). Stir then remove the solvent in vacuo. To the residue add ethylene glycol dimethyl ether (200 ml.), stir then add acetic anhydride (2.3 g.) and continue stirring at room temperature for 1 hour. Remove the solvent in vacuo. Decompose the residue with 5% ammonium chloride solution (250 ml.) and extract the mixture well with ethyl acetate. Wash the extract with water and saturated sodium chloride solution then dry over anhydrous sodium sulfate. Filter, remove the solvent in vacuo and dissolve the residue in chloroform. Pass the solution through active silica gel and elute with chloroform. Evaporate the chloroform in vacuo. Triturate the residue with isopropanol to induce crystallization. Filter to obtain the pure title product as a white crystalline solid.

Example 5 dl - 13 - ethylgona - 1,3,5(10),9(11)-tetraene-3,17β-diol, 3-acetate.—Add dl-13-ethylgona-1,3,5(10),9(11)-tetraene-3,17β-diol, 2.84 g., to a solution containing sodium methoxide (0.540 g.) in anhydrous methanol (40 ml.), stir then remove the solvent in vacuo. Add ethylene glycol dimethyl ether (100 ml.) to the residue, stir then add acetic anhydride (1.10 g.) and stir at room temperature for 15 min., heat on a steam bath for 15 min., cool, then remove the solvent in vacuo. Decompose the residue with 5% ammonium chloride solution (100 ml.) and extract with ethyl acetate. Wash the extract with water and saturated sodium chloride solution then dry over anhydrous sodium sulfate. Filter and remove the solvent in vacuo. Dissolve the crystalline residue in methylene chloride, treat with decolorizing charcoal and filter through filter aid. Replace the methylene chloride with isopropanol by boiling on the steam bath. Seed and let stand to crystallize. Filter the resulting white crystals of pure title compound.

Example 6 dl-13-ethylgona-1,3,5(10),8,14-pentaene-3,17β-diol, 3-acetate.—Add dl - 13 - ethylgona-1,3,5(10),8,14-pentaene-3,17β-diol (1.41 g.) to a solution of sodium methoxide (0.275 g.) in anhydrous methanol (25 ml.), stir then remove the methanol in vacuo. Add ethylene glycol dimethyl ether (100 ml.), stir then add a solution of acetic anhydride (0.510 g.) in ethylene glycol dimethyl ether (15 ml.). Warm the solution for 10 min. on the steam bath, cool and stir at room temperature for 20 min. Remove the solvent in vacuo and decompose the residue with 5% ammonium chloride solution (100 ml.). Extract the mixture well with ethyl acetate. Wash the extract with water and saturated sodium chloride solution then dry over anhydrous sodium sulfate. Filter and remove the solvent in vacuo. Triturate the residue with isopropanol and filter to obtain the title product.

Example 7

The procedure of Example 1 is repeated, substituting for the sodium methoxide, stoichiometrically equivalent amounts of the following alkali metal (lower)alkoxides: potassium methoxide, lithium methoxide, sodium ethoxide, potassium t-butoxide and sodium n-hexoxide. Substantially the same results are obtained.

The procedure of Example 1 is repeated, substituting for the methanol, the following lower alkanols: ethanol, i-propanol, t-butanol and n-hexanol. Substantially the same results are obtained.

The procedure of Example 1 is repeated, substituting for the ethylene glycol dimethyl ether, the following polar inert solvents: dioxane, dimethylformamide and dimethylacetamide. Substantially the same results are obtained.

The procedure of Example 1 is repeated, substituting for acetic anhydride, stoichiometrically equivalent amounts of acetyl chloride and acetyl bromide. Substantially the same results are obtained.

The procedure of Example 1 is repeated, substituting for the acetic anhydride, stoichiometrically equivalent amounts of n-propionic anhydride, i-propionic anhydride, n-butyric anhydride, n-pentanoic anhydride and n-hexanoic anhydride. There are obtained, respectively, dl-13-methylgona-1,3,5(10),8-tetraene-3,17β-diol, 3-n-propionate; dl-13-methylgona-1,3,5(10),8-tetraene-3,17β-diol, 3-i-propionate; dl-13-methylgona-1,3,5(10),8-tetraene-3,17β-diol 3-n-butyrate; dl-13-methylgona-1,3,5(10),8-tetraene-3,17β-diol, n-pentanoate, and dl-13-methylgona-1,3,5(10),8-tetraene-3,17β-diol, n-hexanoate.

Example 8

The procedure of Example 1 is repeated, substituting for dl-13-methylgona-1,3,5(10),8-tetraene-3,17β-diol, stoichiometrically equivalent amounts of the following polyhydroxylated compounds:

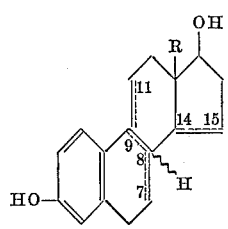

| R | C-8 | Δ⁷ | Δ⁸⁽⁹⁾ | Δ⁹⁽¹¹⁾ | Δ⁸⁽⁹⁾,¹⁴⁽¹⁵⁾ |
|---|---|---|---|---|---|
| CH₃ | C-H(α) | No | No | No | No |
| CH₃CH₂CH₂ | C-H(β) | No | No | No | No |
| (CH₃)₂CHCH₂ | C-H(β) | No | No | No | No |
| CH₃(CH₂)₄CH₂ | C-H(β) | No | No | No | No |
| CH₃CH₂ | | Yes | No | No | No |
| CH₃ | C-H(β) | No | No | Yes | No |
| CH₃ | | No | Yes | No | Yes | and the following 3-(lower)acyloxy-13-alkylgona (and 8-isogona)-1,3,5(10)-triene-17β-ols and analogs are obtained:

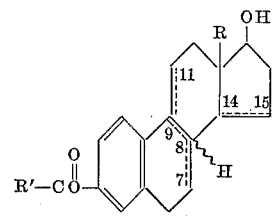

| R | C-8 | Δ⁷ | Δ⁸⁽⁹⁾ | Δ⁹⁽¹¹⁾ | Δ⁸⁽⁹⁾,¹⁴⁽¹⁵⁾ |
|---|---|---|---|---|---|
| CH₃ | C-H(α) | No | No | No | No |
| CH₃CH₂CH₂ | C-H(β) | No | No | No | No |
| (CH₃)₂CHCH₂ | C-H(β) | No | No | No | No |
| CH₃(CH₂)₄CH₂ | C-H(β) | No | No | No | No |
| CH₃CH₂ | | Yes | No | No | No |
| CH₃ | C-H(β) | No | No | Yes | No |
| CH₃ | | No | Yes | No | Yes |

Example 9 dl-13-ethylgona-1,3,5(10)-triene-3,16α,17β-triol, 3-acetate.—Add dl-13-ethylgona-1,3,5(10)-triene-3,16α,17β-triol (prepared by the procedure of Example 177 in Ser. No. 534,353, filed Mar. 15, 1966, 1.41 g.) to a solution of sodium methoxide (0.275 g.) in anhydrous methanol (25 ml.), stir then remove the methanol in vacuo. Add ethylene glycol dimethyl ether (100 ml.), stir then add a solution of acetic anhydride (0.510 g.) in ethylene glycol dimethyl ether (15 ml.). Warm the solution for 10 min. on the steam bath, cool and stir at 22° C. for 20 min. Remove the solvent in vacuo and decompose the residue with 5% ammonium chloride solution (100 ml.). Extract the mixture well with ethyl acetate. Wash the extract with water and saturated sodium chloride solution then dry over anhydrous sodium sulfate. Filter and remove the solvent in vacuo. Triturate the residue with isopropanol and filter to obtain the title product.

In a similar manner, dl-13-methylgona-1,3,5(10),8-tetraene-3,16α,17β-triol, 3-acetate is prepared from dl-13-methylgona-1,3,5(10),8-tetraene-3,16α,17β-triol; dl-13-methyl-1,3,5(10),7-tetraene-3,16α,17β-triol, 3-acetate is prepared from dl-13-methylgona-1,3,5(10),7-tetraene-3,16α,17β-triol; and dl-13-ethylgona-1,3,5(10),8,14-pentaene-3,16α,17β-triol, 3-acetate is prepared from dl-13-ethylgona-1,3,5(10),8,14-pentaene-3,16α,17β-triol.

What is claimed is:
1. A process for the preparation of a 3-(lower)acyloxy-13-alkylgona-(and 8-isogona) 1,3,5(10)-trien-17β-ol of the formula

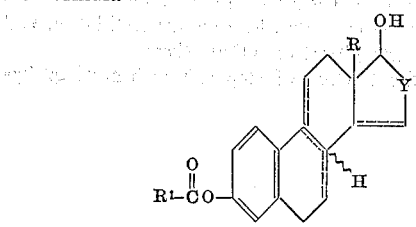

and the Δ⁷-, the Δ⁸⁽⁹⁾-, and Δ⁹⁽¹¹⁾-, and the Δ⁸⁽⁹⁾,¹⁴⁽¹⁵⁾- dehydro analogs thereof, wherein R and R¹ are lower alkyl; Y is methylene or hydroxymethylene, the symbol (ξ) indicates α- or β- configuration, and the broken lines indicate unsaturation in said analogs, which comprises selectively acylating the 3-hydroxy group of a corresponding polyhydroxylated steroid compound of the formula:

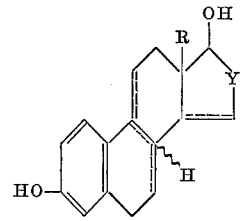

wherein R and Y are as hereinabove defined by:
(a) reacting said polyhydroxylated steroid with at least about one equivalent of an alkali metal (lower)alkoxide in a lower alkanol medium until conversion of the 3-hydroxyl group to the corresponding anionic form is substantially complete;
(b) displacing said lower alkanol medium with a polar inert solvent medium;
(c) reacting the mixture of Step (b) with at least about one equivalent of a (lower)acyl anhydride or (lower) acyl halide until conversion of the anionic form of the 3-hydroxyl group to a (lower)acyloxy group is substantially complete; and
(d) recovering the product of Step (c).

2. A process as defined in claim 1 wherein, in Step (a), said alkali metal alkoxide is sodium methoxide and said lower alkanol medium is methanol.

3. A process as defined in claim 1 wherein, in Step (b) said polar inert solvent medium is ethylene glycol dimethyl ether.

4. A process as defined in claim 1 wherein Step (c) is carried out at a temperature of from about 25° C. to about 100° C. for from about 15 minutes to about three hours.

5. A process as defined in claim 1 wherein 13-methylgona-1,3,5(10),8-tetraene-3,17$\beta$-diol, 3-acetate is prepared by
(a) reacting 13-methylgona-1,3,5(10),8-tetraene-3,17$\beta$-diol with sodium methoxide in methanol;
(b) removing the methanol by vacuum distillation and adding ethylene glycol dimethyl ether;
(c) reacting the mixture of Step (b) with acetic anhydride; and
(d) recovering the product by removing the solvent by distillation in a vacuum.

6. A process as defined in claim 1 wherein 13-ethylgona-1,3,5(10),8-tetraene-3,17$\beta$-diol, 3-acetate is prepared by
(a) reacting 13-ethylgona-1,3,5(10),8-tetraene-3,17$\beta$-diol with sodium methoxide in methanol;
(b) removing the methanol by vacuum distillation and adding ethylene glycol dimethyl ether;
(c) reacting the mixture of Step (b) with acetic anhydride; and
(d) recovering the product by removing the solvent by distillation in a vacuum.

7. A process as defined in claim 1 wherein d-13-methylgona-1,3,5(10)-triene-3,17$\beta$-diol, 3-acetate is prepared by
(a) reacting d-13-methylgona-1,3,5(10)-triene-3,17$\beta$-diol with sodium methoxide in methanol;
(b) removing the methanol by vacuum distillation and adding ethylene glycol dimethyl ether;
(c) reacting the mixture of Step (b) with acetic anhydride; and
(d) recovering the product by removing the solvent by distillation in a vacuum.

8. A process as defined in claim 1 wherein 13-methylgona-1,3,5(10),7-tetraene-3,17$\beta$-diol, 3-acetate is prepared by
(a) reacting 13-methylgona-1,3,5(10),7-tetraene-3,17$\beta$-diol with sodium methoxide in methanol;
(b) removing the methanol by vacuum distillation and adding ethylene glycol dimethyl ether;
(c) reacting the mixture of Step (b) with acetic anhydride; and
(d) recovering the product by removing the solvent by distillation in a vacuum.

9. A process an defined in claim 1 wherein 13-ethylgona-1,3,5(10),9(11)-tetraene-3,17$\beta$-diol, 3-acetate is prepared by
(a) reacting 13-ethylgona-1,3,5(10),9(11)-tetraene-3,17$\beta$-diol with sodium methoxide in methanol;
(b) removing the methanol by vacuum distillation and adding ethylene glycol dimethyl ether;
(c) reacting the mixture of Step (b) with acetic anhydride; and
(d) recovering the product by removing the solvent by distillation in a vacuum.

10. A process as defined in claim 1 wherein 13-ethylgona-1,3,5(10),8,14-pentaene-3,17$\beta$-diol, 3-acetate is prepared by
(a) reacting 13-ethylgona-1,3,5(10),8,14-pentaene-3,17$\beta$-diol with sodium methoxide in methanol;
(b) removing the methanol by vacuum distillation and adding ethylene glycol dimethyl ether;
(c) reacting the mixture of Step (b) with acetic anhydride; and
(d) recovering the product by removing the solvent by distillation in a vacuum.

11. A process as defined in claim 1 wherein 13-ethylgona-1,3,5(10)-triene-3,16$\alpha$,17$\beta$-triol, 3-acetate is prepared by
(a) reacting 13-ethylgona-1,3,5(10)-triene-3,16$\alpha$,17$\beta$-triol with sodium methoxide in methanol;
(b) removing the methanol by vacuum distillation and adding ethylene glycol dimethyl ether;
(c) reacting the mixture of Step (b) with acetic anhydride; and
(d) recovering the product by removing the solvent by distillation in a vacuum.

No references cited.

HENRY A. FRENCH, Primary Examiner

U.S. Cl. X.R.

260—999